United States Patent [19]

Baird

[11] 4,093,479
[45] June 6, 1978

[54] THIN-FILM PROCESSING APPARATUS AND METHOD

[75] Inventor: James L. Baird, Winchester, Mass.

[73] Assignee: Artisan Industries Inc., Waltham, Mass.

[21] Appl. No.: 759,196

[22] Filed: Jan. 13, 1977

Related U.S. Application Data

[63] Continuation of Ser. No. 587,995, Jun. 18, 1975, abandoned.

[51] Int. Cl.² .............................................. B01D 1/22
[52] U.S. Cl. .................................... 159/6 W; 159/49; 159/13 A
[58] Field of Search .................... 159/6 W, 6 WH, 49

[56] References Cited

U.S. PATENT DOCUMENTS

| | | | |
|---|---|---|---|
| 2,927,634 | 3/1960 | Gudheim | 159/6 W |
| 2,974,725 | 3/1961 | Samesreuther | 159/6 W |
| 3,009,514 | 11/1961 | Cohen | 159/6 W |
| 3,017,289 | 1/1962 | Miller | 159/6 W |
| 3,020,211 | 2/1962 | Smith | 159/6 W |
| 3,130,108 | 4/1964 | Eckstrom | 159/6 W |
| 3,211,209 | 10/1965 | Latinur | 159/6 W |
| 3,348,600 | 10/1967 | Monty | 159/6 WH |
| 3,357,477 | 12/1967 | Monty | 159/6 WH |
| 3,891,495 | 6/1975 | Baird | 159/6 WH |

OTHER PUBLICATIONS

Kontro "Adjust-O-Film" Centrifugal Processing Equip Bulletin 575, The Kontro Co. Inc., Petersham, Mass., 1958.

Primary Examiner—Norman Yudkoff
Attorney, Agent, or Firm—Richard P. Crowley

[57] ABSTRACT

A thin-film wiped evaporator with rotary blades having a helical twist, the twist of the blades increasing from the one to the other end so as to provide a maximum twist at the one or the other end of the evaporator.

8 Claims, 3 Drawing Figures

Fig. 1.

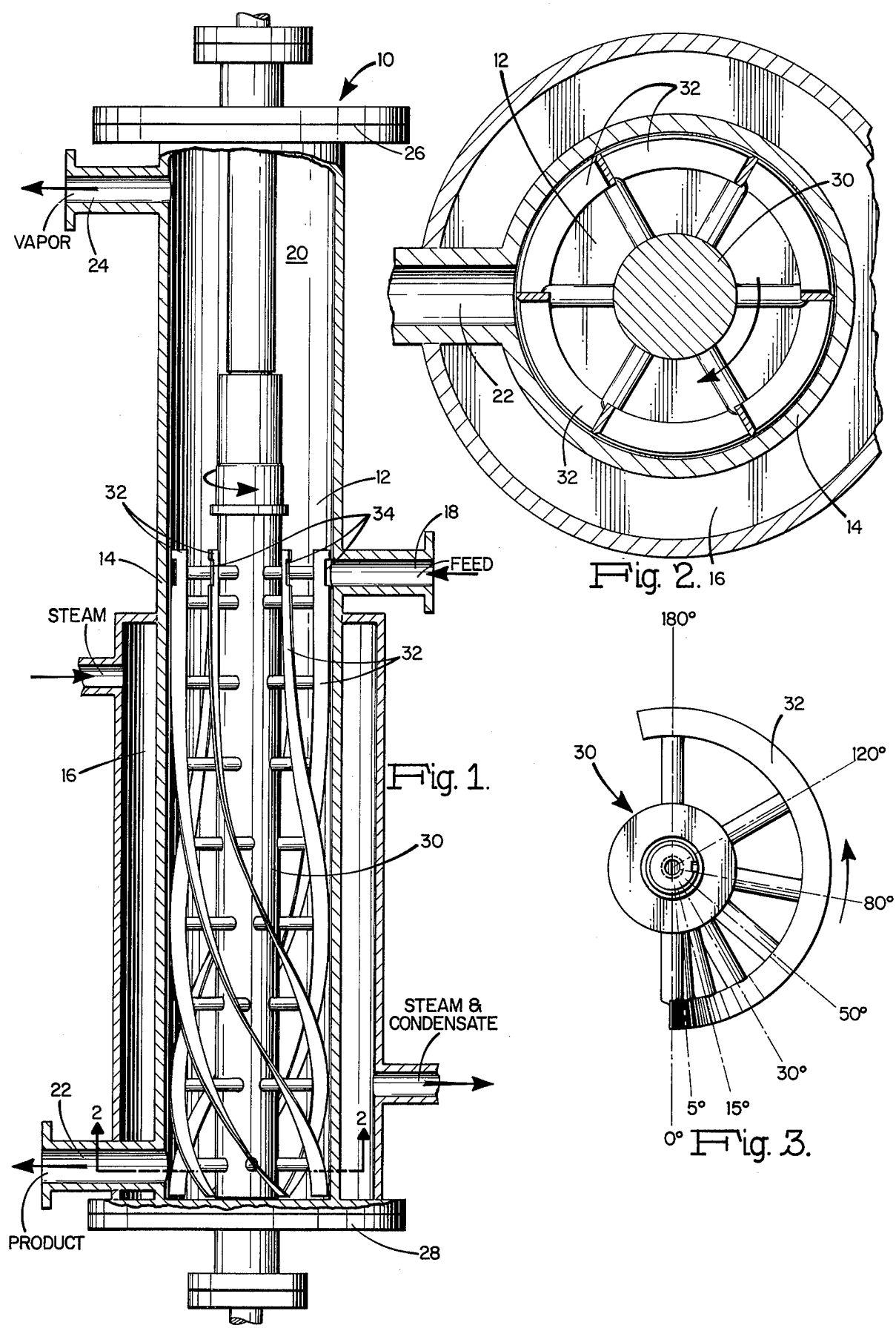

THIN-FILM PROCESSING APPARATUS AND METHOD

This is a continuation of application Ser. No. 587,995, filed June 18, 1975, now abandoned.

BACKGROUND OF THE INVENTION

In a wiped or turbulent thin-film processing apparatus, particularly with vertically axised evaporators, it is particularly difficult to obtain good thin-film agitation on the interior wall surface as the amount of fluid processed through the apparatus from the feed inlet to the product outlet ends decreases in the thin film by evaporation. There have been attempts to overcome this difficulty and to control the flow and/or residence time of the fluid material in both horizontally and vertically axised thin-film evaporators. With liquid materials, for example, of low viscosity, it is often desirable to obtain a longer flow path or longer residence time, while for materials of higher viscosity, typically a shorter flow path or shorter residence time is required. Control of flow time and residence time in thin-film evaporators has been attempted through modifications of the rotary blades in the evaporators, such as, for example, by the use of a tapered thin-film evaporator as set forth in U.S. Pat. No. 2,927,634 or by employing wedges on rotary blades as set forth in U.S. Pat. No. 3,348,600.

In particular, U.S. Pat. No. 3,357,477, issued Dec. 12, 1967, describes a rotary thin-film-type liquid evaporator which employs helical rotor blades to control the flow path and residence time of a material being processed through the evaporator. In one embodiment, the rotor blades are twisted throughout their entire length in order to control the flow and residence time. As set forth in the patent, the degree of offset or the extent of the helical twist of the blades employed is critical, since the degree of offset cannot be so large that the vector forces developed prevent the processing of material or cause process material to remain in the evaporator for too long a time period, resulting in thermo-degradation of the material. In this patent, rotor blades with helical turns of 180° or more have been found to be unsatisfactory for control purposes, since the back force created by such large extent of blade offset is so great that it becomes extremely difficult or impossible to process material through the evaporator. Typically then where the blade is helically twisted over the entire length, the extent of the helical twist is not more than about ½ to 30° of twist per linear foot of blade length. This patent does not discuss and is not directed to the problems associated with the diminution of the film thickness as the film decreases in thickness from the feed to the product end on the interior wall of the evaporator.

SUMMARY OF THE INVENTION

My invention relates to new and unique thin-film processing apparatus and method, and in particular, my invention is directed toward a rotary wiped thin-film-type liquid evaporator having helical rotor blades, the pitch of such blades continuously varying from the feed inlet to the product outlet ends of the evaporator, so as to permit, particularly in vertical evaporator units, good agitation on the wall surface of the evaporator as the amount of material in thin-film form processed decreases due to evaporation as the film progresses from the feed to the product outlet.

I have found that, with prior art helical blade-type evaporators, such evaporators, particularly when employed in a vertical position, flood at the feed inlet end durng high liquid-loading conditions. Further, I have also found that the straight-bladed-designed evaporators, with wedges at the blade end projecting out little beyond the blade ends themselves, are not wholly satisfactory when the liquid film on the wall surface becomes very thin; that is, as the liquid film being processed approaches the product outlet end of the evaporator.

My invention permits the processing of materials through a thin-film evaporator with good agitation on the wall surface of the evaporator, even though the thin film varies in thickness as it progresses from the feed to the product outlet. More particularly, my invention permits the employment of helical rotary blades in a rotary-type evaporator, which blades may have a helical twist per linear foot of blade length which can exceed the limitations set forth in U.S. Pat. No. 3,357,477, and is an improvement on the apparatus and method therein. My invention will be described in particular in connection with a vertical-axised, cylindrical, rotary, thin-film evaporator; however, it is recognized and is within the spirit and scope of my invention that my invention is equally applicable to tapered-type evaporators, as well a horizontally axised evaporators of both the cocurrent and countercurrent type.

My invention thus concerns a thin-film rotary-type evaporator, the evaporator containing helically twisted blades in which there is a continuous varying pitch of the blades, starting with no or little pitch at the feed inlet end of the evaporator, and with a continuous increasing pitch as desired as the blade approaches the product outlet of the evaporator. The continuous varying increase in pitch of the blades is increased in relationship to the decrease in the thin-film fluid being processed in the evaporator, with the maximum pitch occurring at or about the product discharge outlet.

In the embodiment described, the rotation of the rotor blades of the evaporator is in the direction of providing a hold back for increasing the residence time of the material as it progresses through the evaporator. However, if desired, the pitch can be reversed or rotation of the rotor reversed. The selection of the particular continuing and varying pitch of the helical blade, the direction of rotation and the direction of the pitch will, of course, depend upon the material being processed, the desired flow and residence time and other factors. Typically and preferably, the total helical twist or pitch of the rotor blades from the feed inlet to the product outlet ranges from about 90° to 180°, may be more or less as desired; that is, the continuous varying of the pitch of the helical blade may vary from the feed to the product outlet from 0° to 180°. By varying continuously the pitch, rather than having a constant or uniform pitch or twist, the rotor blade is permitted to be twisted more than the critical helical twist limitations imposed in the prior art, with the result that flooding at the feed inlet end by the material is prevented with good agitation of the thin film on the interior wall of the surface of revolution from the feed inlet to the product outlet, even though the film thickness varies or decreases as you approach the product outlet.

BRIEF DESCRIPTION OF THE DRAWINGS

FIG. 1 is a schematic, longitudinal section through a cylindrical rotary-wiped thin-film evaporator of my invention.

FIG. 2 is a sectional end view taken along the lines 2—2 of FIG. 1.

FIG. 3 is a representative end view showing a single helical blade on the rotor, with the varying degrees of continuous pitch expressed in angles about the blade.

DESCRIPTION OF THE EMBODIMENTS

With reference to the drawings where there is illustrated one embodiment of my invention, there is shown a vertically axised wiped thin-film rotary countercurrent evaporator 10 which comprises a closed, cylindrical processing chamber 12 having an interior wall 14 surrounded by a greater part of its length by a temperature-control jacket 16 adapted for the introduction of a heat-exchange fluid, such as steam, cold water or the like. The chamber 12 is characterized by a feed inlet 18 and a product outlet 20 spaced apart from and at the opposite end thereof and a vapor outlet 24, which vapor outlet extends from a vapor chamber 22 which is adjacent the feed inlet end of the evaporator. A condenser and a vacuum means (not shown) may be placed in communication with the vapor outlet 24 to permit condensation of the vapor and operation of the evaporator under subatmospheric conditions. The evaporator described is a countercurrent evaporator; however, my invention is equally applicable with concurrent evaporators wherein the vapor chamber may be placed at the product oulet end of the evaporator. At each end are closing heads 26 and 28 which support a centrally axised tube-like rotor 30, which rotor extends from the one to the other end of the chamber 12 and through the vapor chamber 22. The rotor 30 is driven by a motor, such as a reversible motor, or other means (not shown) which may be placed at either end. The rotor generally extends outwardly from each end of the closing heads. Rotor 30 extends through suitable bearings and seals and the seal packing at each end of the evaporator. The rotor 30 is typically mounted for axial displacement; that is, it is adjusted by any desired or convenient means and may include a series of grooves of threads which locate the position of the rotor 30 with respect to the end rotor blades.

Extending axially outwardly from the rotor shaft 30 is a plurality of radial rotor blades 32 which are nonsymmetrically and smoothly twisted to extend radially from the one to the other end of the chamber between the feed inlet 18 and the product outlet 20. The radial edges of the helically twisted varying pitch blades are smooth and extend into a small but generally uniform, closely spaced, thin-film relationship with respect to the interior wall 14 of the chamber 12, so that, upon rotation of the rotor shaft 30, the rotor blades 32 provide a thin, wiped or turbulent film of the processing material on the interior walls 14 of the chamber 12. The direction of rotation as illustrated is such as to impart a vector force back toward the feed inlet 18 in order to provide for increasing the residence time of the material being processed through the evaporator 10.

As illustrated, the rotor blades 32 are characterized by a continuous nonsymmetrical, helical, axial pitch or twist along the rotor blades 32 from one to the other end; i.e., between the feed inlet 18 and the product outlet 20. A short section of each of the rotor blades through the longitudinal axis are aligned with the rotor at the feed inlet end and at the product outlet 20 end at 180° from the position of the blades at the feed inlet 18. Optionally, the rotor blades 32 have a notched opening 34 in the rotor blades adjacent and extending across the width of the feed inlet 18 which permits material to be fed into the evaporator to be placed rapidly in thin-film form on the interior wall, and makes entry of the material into the processing chamber easier.

As illustrated in FIG. 3, the rotor blades continually vary in pitch or helical twist of the blades for a total of 180°, with approximately 90° of the pitch of the rotor blades occurring at the half-way point of the processing chamber. The degree of pitch progressively and rapidly increases from the feed inlet 18 to the product outlet 20 shown more particularly in FIG. 3. If desired, the rotor blade pitch may be mathematically relationed and designed to a relationship with the varying degree of material film thickness within the processing chamber.

As illustrated in FIG. 3, the rotor blades have a continually varying pitch, starting with almost no pitch at all at the feed inlet 16 to 180° change in position and no pitch at all at the product outlet 18. This particular rotor design may be applied to both vertical and horizontal evaporators, and there are varying combinations with pitch and continuations of pitch which may be utilized for specific problems involved in processing specific materials.

In operation, a liquid, such as a low-viscosity liquid, to be processed is introduced into the feed inlet 18 by pump or gravity. The evaporator may operate under supra or subatmospheric conditions. The liquid material is permitted to move downwardly and is formed into a thin-film form onto the interior wall 16 of the chamber 18 by the rotating rotor blades 32, and a relatively nonvolatile product material with increased viscosity or powder or slurry is withdrawn from the product outlet 20, and the vaporized volatile material is withdrawn from the vapor chamber through vapor outlet 24. A heat-exchange fluid, such as steam, is introduced into the temperature-control jacket 16 so that the thin film on the interior wall is placed in a heat-exchange relationship to effect evaporation of the relatively volatile component of the feed material as the material progresses through the evaporator. The helical rotor blades with continually varying pitch rotating as illustrated exert a backward directional force on the material, and due to the varying pitch, provide for a greater force and turbulence as the thin film on the wall decreases in thickness as it approaches the product outlet. My helical blades with a continually varying pitch provide for excellent agitation of the thin film on the wall throughout the entire length of the processing chamber.

My invention has been described in particular in connection with a particular evaporator; however, my continually varying pitch with helical rotor blades may be usefully employed in a wide variety and types of thin-film evaporators.

What I claim is:

1. In a fluid-processing apparatus of the wiped thin-film type, which apparatus comprises in combination:
   (a) a substantially vertical closed chamber characterized by an interior wall defining a heated surface of revolution;
   (b) a rotor shaft within the chamber;
   (c) means to rotate the rotor shaft;
   (d) a feed inlet at the upper part of the chamber for the introduction of feed material;
   (e) a product outlet remotely spaced apart and downstream from the feed inlet for removal of product material;
   (f) a vapor chamber within the closed chamber and upstream of the feed inlet;

(g) a vapor outlet in the vapor chamber for the removal of vapor; and (h) a plurality of rotor blades secured to the rotor shaft for rotation therewith, the blades having a one end and another end, and radially and axially arranged from the rotor shaft and extending into a thin-film-forming relationship with the interior wall, said blades extending from the vicinity of the feed inlet to the vicinity of the product outlet, the peripheral edges of said blades being smooth along their length, the improvement which comprises the rotor blades characterized by a helical twist therein from the one to the other end of the blades, and the helical twist of such blades varying continuously and nonsymmetrically from one to the other end, the total helical twist of the rotor blades increasing from the feed inlet to the product outlet, up to about 180° so as to provide a maximum twist of the rotor blades at the product outlet of the apparatus, and wherein the rotor blades are substantially aligned with the rotor axis at or about the feed inlet, and wherein the degree of twist of the helical blades from the feed inlet to the product outlet increases in relationship to the film thickness of the thin film on the interior wall of the chamber, thereby providing good agitation of the thin film of material being processed, as the film decreases in thickness by evaporation, on the surface of revolution from the feed inlet to the product outlet.

2. The apparatus of claim 1 wherein the rotor blades vary in helical twist from about ½ to 30° per linear foot of the rotor blades.

3. The apparatus of claim 1 wherein the rotor blades adjacent the feed inlet of the apparatus are characterized by a notched area therein to ease the introduction of feed material into the chamber.

4. The apparatus of claim 1 wherein the total twist of the blades from the inlet to the outlet varies from about 90° to 180°.

5. The apparatus of claim 1 wherein the degree of twist of the blades ranges from about 90° to 180° in the second half of the length of the blades between the feed inlet and the product outlet.

6. A method of treating a fluid feed material in an evaporator apparatus which comprises a closed chamber having interior walls which define a heated surface of revolution, and a feed inlet at the one end and a product outlet at the other end, and which includes rotor blades within the chamber between the feed inlet and the product outlet, which method comprises:

(a) forming a wiped film of a fluid feed material introduced into the chamber onto the interior wall of the surface of revolution by the rotation of the rotor blades, the rotor blades characterized by a nonsymmetrical helical twist extending from the one to the other end of the chamber; and (b) varying the helical twist up to about 180° of the rotor blades continuously and progressively from the one to the other end of the chamber in relationship to the film thickness on the heated surface of revolution, with the maximum twist at or about the product outlet, to provide for continuous agitation of the wiped thin film on the surface of revolution from the feed inlet to the product outlet of the chamber, while the wiped film of material moves from the inlet to the outlet and is progressively decreased in film thickness by evaporation.

7. The method of claim 6 which comprises axially aligning the rotor blades with the rotor in the vicinity of the feed inlet.

8. The method of claim 6 wherein the apparatus is a vertically aligned evaporator, and which includes: feeding a feed material into the top of the evaporator wherein the twist of the helical blades varies from the upper feed inlet to the lower product outlet end of the evaporator in a manner such that there is substantially no twist at the feed inlet, and wherein the twist continuously varies, increasing in twist as the twist of the rotor blades approaches the product outlet area, and wherein the rotation of the blades is in the direction of imparting a backward vector force to the feed material as it progresses from the feed inlet to the product outlet.

* * * * *